C. A. BENOIST.
SHOCK REGISTER FOR AUTOMOBILES.
APPLICATION FILED OCT. 10, 1911.
1,042,525.
Patented Oct. 29, 1912.
2 SHEETS—SHEET 1.
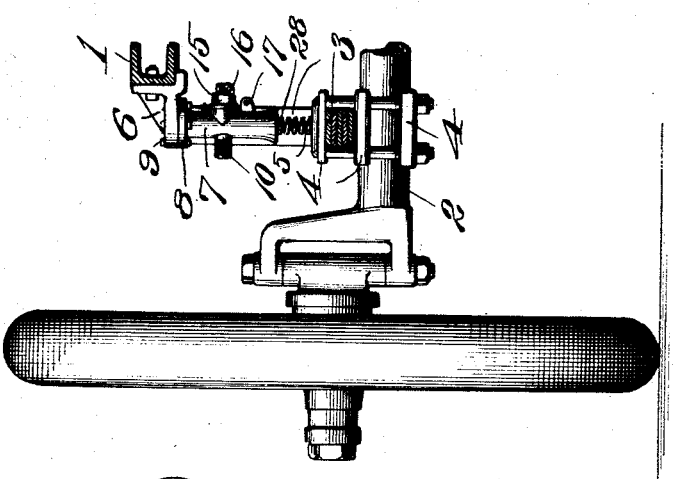
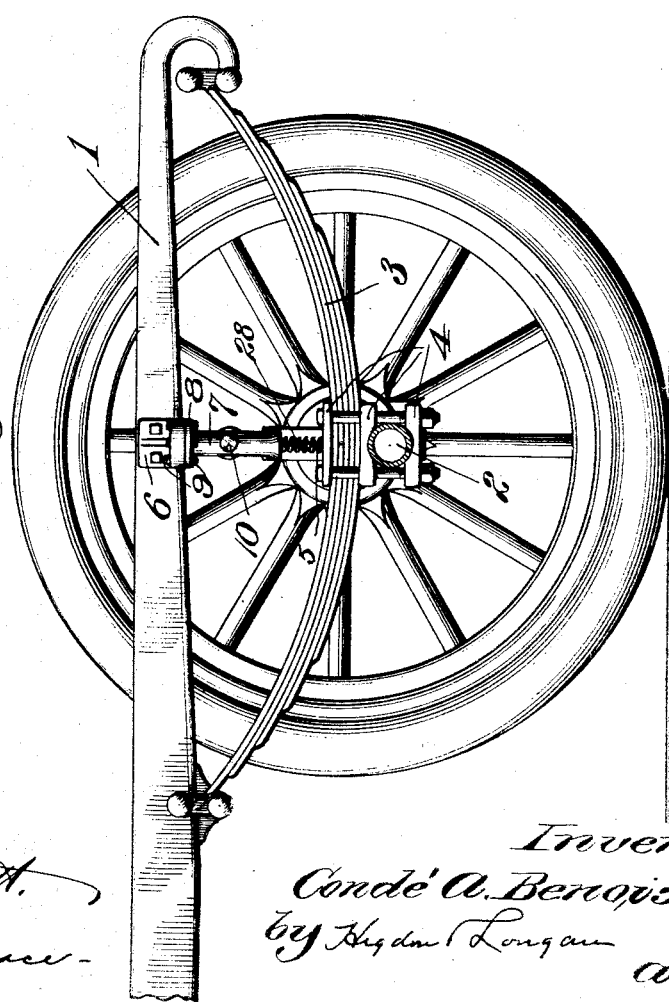
Attest:
W. H. Scott
E. L. Wallace
Inventor:
Condé A. Benoist
by Hayden Longan
attys.

C. A. BENOIST.
CLOCK REGISTER FOR AUTOMOBILES.
APPLICATION FILED OCT. 10, 1911.
1,042,525.
Patented Oct. 29, 1912.
2 SHEETS—SHEET 2.
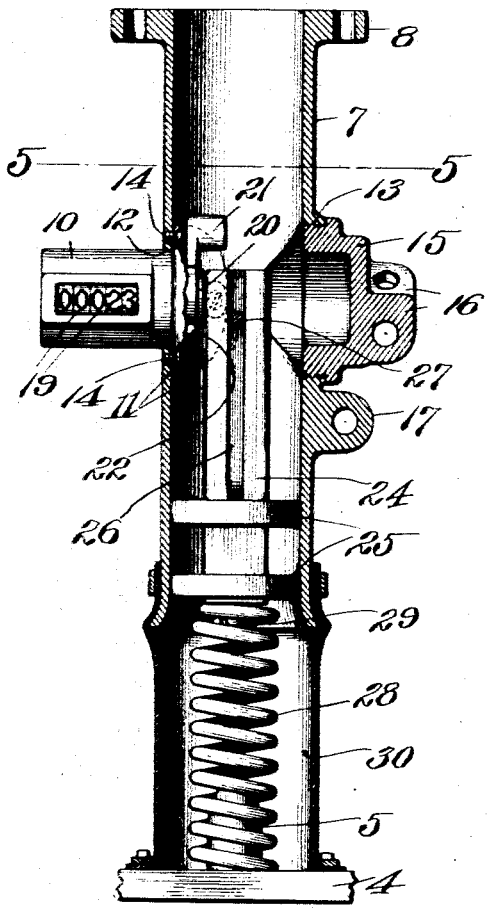
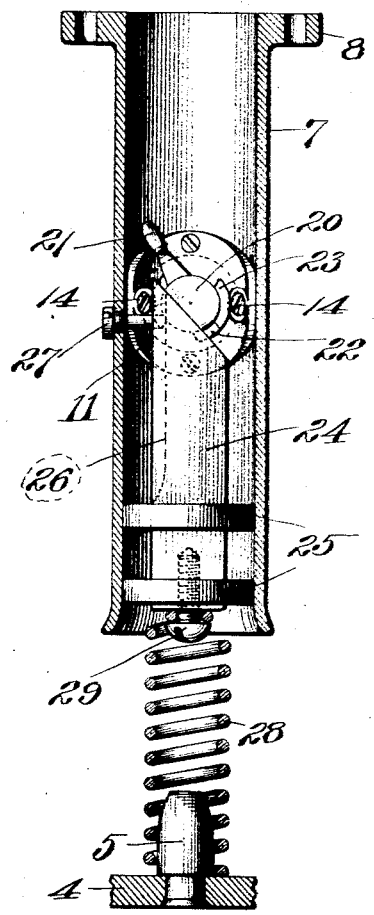
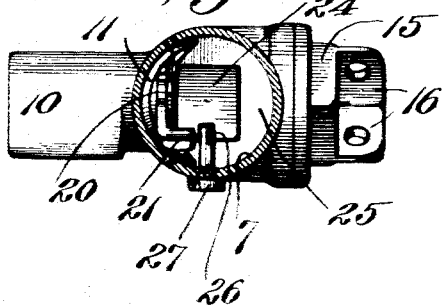
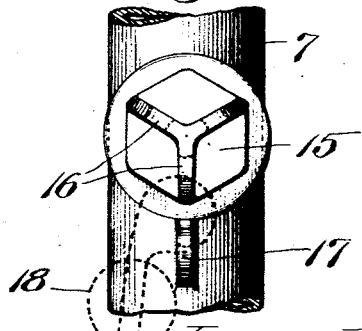
Inventor:
Condé A. Benoist

UNITED STATES PATENT OFFICE.

CONDÉ A. BENOIST, OF ST. LOUIS, MISSOURI.

SHOCK-REGISTER FOR AUTOMOBILES.

1,042,525.   Specification of Letters Patent.   Patented Oct. 29, 1912.

Application filed October 10, 1911. Serial No. 653,940.

*To all whom it may concern:*

Be it known that I, CONDÉ A. BENOIST, a citizen of the United States, and resident of St. Louis, Missouri, have invented certain new and useful Improvements in Shock-Registers for Automobiles, of which the following is a specification containing a full, clear, and exact description, reference being had to the accompanying drawings, forming a part hereof.

My invention relates to improvements in shock registers for automobiles, and the object of my invention is to construct a means for automatically registering the number of times the automobile is subjected to unusual shocks, or the number of times the springs between the axle and the body are subjected to unusual deflections whereby the automobile owner may ascertain with what care the automobile has been driven.

With the above purposes in view my invention consists in certain novel features of construction and arrangement of parts as will be hereinafter more fully described, pointed out in the claims and illustrated by the accompanying drawings, in which—

Figure 1 shows a portion of the forward truck of an automobile having my invention applied thereto; Fig. 2 shows in elevation a portion of the forward truck of an automobile having my invention applied thereto; Fig. 3 is an enlarged, detail, vertical, sectional elevation of my improved shock register; Fig. 4 is a vertical, sectional elevation of my improved register taken at right angles to Fig. 3; Fig. 5 is a sectional plan taken on the line 5—5 of Fig. 3; and Fig. 6 is a detail figure illustrating the manner of securing the registering mechanism against being tampered with.

Referring by numerals to the accompanying drawings: 1 designates the chassis or frame for the body portion of an automobile. 2 designates the axle and 3 the leaf springs between the chassis and the axle.

4 designates a clip which secures the springs 3 to the axle 2. Extending upwardly from the upper face of the uppermost plate of the clip 4 there is a boss 5.

Secured to the side of the chassis 1, immediately over the axle 2, there is a bracket 6.

7 designates a cylindrical casing having at its upper end an annular flange 8 which is arranged to be secured to the bracket 6 by means of bolts or rivets 9.

10 designates the casing of the register proper, the casing being substantially cylindrical and provided on its inner end with an annular concavo-convexed flange 11.

The cylindrical casing 7 is provided with transversely alining openings 12 and 13, and in assembling the register casing 10 is inserted through the opening 12 and the flange of the casing 10 secured by the screws 14 to the body of the casing 7.

15 designates a nut which is secured in the opening 13 of the casing 7 for the closure of the opening. The nut 15 is provided with perforated webs 16 which coöperate with a perforated ear 17 to form a means whereby a seal, such as is shown in dotted lines at 18 in Fig. 6, may be employed to secure the casing 7 against being opened.

The casing 10 of the register proper contains the ordinary geared disks 19 having numerals arranged on their peripheries, and may be properly termed a "decimal" counter.

For the reason that I may employ different forms of such registers and their mechanisms is so well known I do not deem it necessary to illustrate or describe the detailed structure thereof. However, in the structure shown, one of the disks is secured to rotate with a shaft having thereon a head 20 which normally occupies a position within the casing 7. For the rotation of the head 20 there is a lever 21 and, as means for limiting the movement of the lever 21, I have provided a projection 22 on the lever 21 and the stops 23 which are preferably formed integral with the flange 11 of the register casing.

24 designates a plunger, the upper face of which is inclined and carried by the plunger there are the disk-shaped guides 25 which contact with the inner face of the casing 7 to effect the guiding of the plunger 24. In order that the plunger may be prevented from turning relative to the casing 7 the forward face of the plunger is slotted at 26 for the reception of a pin 27 carried by the casing 7. Interposed between the bottom end of the plunger 24 and the upper plate of the clip 4 there is a flexible device 28 such as a coil spring which is secured to the plunger by means of a screw 29 and at its opposite end embraces the boss 5. The flexibility of such a device as a coil spring permits of lateral movements of the casing 7 relative to the clip 4. In fact, if it were not necessary to provide for the lateral movements of the car body relative to the supporting axles the connecting means, such as 28, between the plunger 24 and the clip 4, could as well be a rigid connection, the function of which means is solely to hold the plunger in a fixed given position relative to the axle.

In order that the spring 28, or other plunger actuating device, be covered and protected against being tampered with I have provided the elastic and flexible tubing 30 which is secured to the bottom end of the casing 7 and to the upper plate of the clip 4.

When an automobile is equipped with such a device as shown and described, assuming the car to be one which is driven by an operator other than the owner, the device serves as a means to enable the owner to determine with what degree of care the car has been driven. It is well known that when a car is not driven properly, especially over rough ground and at an unusual rate of speed, there will be imparted to the body of the car excessive vertical movements which imply unusual spring deflections. By the arrangement of the plunger 24 and lever 21 of the registering mechanism, all such unusual deflections of the springs, between the axle and the chassis, will be registered and the owner of the car may determine whether or not the car has been carefully handled by the number of spring deflections registered. I am aware that such registering may be accomplished by means other than those shown and described, hence I do not wish to be understood as limiting myself to the specific form of shock registering means disclosed in this application.

I claim:

1. In combination with a wheeled rigid support and a frame yieldingly mounted on said support, a registering instrument secured to said frame, and means interposed between said instrument and said rigid support for the operation of said instrument, a portion of said last mentioned means being flexible to permit of lateral movements of the frame and instrument relative to the rigid support.

2. In a shock register for automobiles, a casing, a registering instrument carried by said casing, an operating lever for said instrument positioned within said casing, a plunger, arranged for movement in said casing, for the operation of said lever, and a flexible connection between said plunger and the axle of the automobile.

3. In a shock register for automobiles, a casing, a registering instrument carried by said casing, an operating lever for said instrument positioned within said casing, a plunger, arranged for movement in said casing, for the operation of said lever, a flexible connection between said plunger and the axle of the automobile, and a flexible covering for the flexible connection.

4. In combination with a supporting element and an element yieldingly supported thereby, a registering device secured to one of said elements, and a connection between the registering device and the other element, said connection being of such nature as to effect an operation of the registering device upon relative vertical movements of said elements and permit of longitudinal or lateral relative movements of said elements without effecting an operation of the registering device.

In testimony whereof, I have signed my name to this specification, in presence of two subscribing witnesses.

CONDÉ A. BENOIST.

Witnesses:
 E. L. WALLACE,
 N. G. BUTLER.